Nov. 16, 1965   C. C. LEVERE   3,217,449
SCAFFOLD RACK
Filed Dec. 6, 1963

INVENTOR.
CHESTER C. LEVERE
BY Kimmel & Crowell
ATTORNEYS.

United States Patent Office 3,217,449
Patented Nov. 16, 1965

3,217,449
SCAFFOLD RACK
Chester C. Levere, 24 W. 066 St., Charles Road, Wheaton, Ill.
Filed Dec. 6, 1963, Ser. No. 328,688
5 Claims. (Cl. 52—143)

This invention relates to a scaffold rack and more particularly to a device which will function as either a scaffold or a rack and which may be self supporting or carried by a conventional pickup truck.

A primary object of this invention is the provision of a device of the type described, which is sturdy and durable in construction, reliable and efficient in use, and relatively simple and inexpensive to manufacture, assemble, utilize, and maintain.

Another object of this invention is to provide a scaffold rack which is quickly and easily assembled and disassembled.

Still another object of this invention is the provision of a scaffold rack which may be readily modified by adding additional units.

A further object of this invention is the provision of such a device which, when disassembled, is small and compact for easy handling and shipping.

A still further object of the instant invention is the provision of a scaffold rack device for use in conjunction with a conventional pickup truck having a cab portion and a bed portion which allows the truck operator complete access to his bed portion even when the device is assembled.

An additional object of this invention is the provision of a scaffold rack which may be readily accommodated to a pickup truck for forming a completely mobile scaffold or rack unit to enable the operator to work on ceilings, the underside of bridges, or the like while still having free access to the materials carried by the bed portion of the truck.

Another object of the instant invention is to provide such a device which may be easily modified to mount the same on caster wheels in those instances where a self-supporting structure is necessary or desirable.

Yet another object of the instant invention is the provision of a scaffold rack of the type described, which is extremely strong even when a plurality of units are mounted atop each other, and which is comprised of flat bar members so that elements carried thereon will lay even and will not be damaged by the same.

Still another object of this invention is to provide a scaffold rack for use with a pickup truck having a protector portion which extends in overlying relationship to the top of the cab portion of the pickup truck to preserve the same against injury.

A further object of the invention is to provide a scaffold rack wherein portions of the same may be readily removed to allow large objects such as sand blast tanks, cement guns, pianos, refrigerators, or the like to be placed in the bed portion of a truck carrying the same, the portions of the scaffold rack being readily replaced thereafter.

Still another object of the instant invention is the provision of a device of the character described having foot plates or members engageable with the sill portions of a pickup truck adjacent the conventional stake pockets whereby the truck body itself will bear the weight of the load rather than the stake pockets.

Other and further objects reside in the combinations of elements, arrangements of parts, and features of construction.

Still other objects will in part be obvious and in part be pointed out as the description of the invention proceeds, and as shown in the accompanying drawing wherein.

Figure 4:
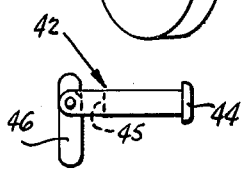
Figure 5:
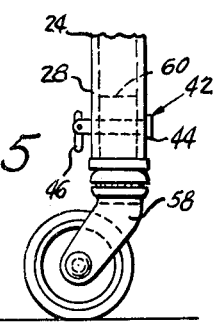

FIG. 4 is an enlarged side elevational view of a pin member used as the attaching means between superimposed upright members of adjacent scaffold rack units and between the upright members, cross bars, and side bars of each scaffold rack unit; and FIGURE 5 is an enlarged fragmentary side elevational view showing a caster wheel carried by one of the upright members of the lowermost scaffold rack units with a pin member such as shown in FIGURE 4 attaching these elements together.

Similar reference characters refer to similar parts throughout the several views of the drawing.

Referring now to the drawing, a scaffold rack in accordance with the instant inventive concept is designated generally by the reference numeral 10 and is shown as mounted on a conventional pickup truck 12 having a cab portion 14 with a top or roof 16, and a bed portion 18 disposed below the top 16 of the cab portion 14 and including upstanding sidewalls 20 (only one being shown in the drawing) with sills 22 including portions defining stake pockets (not shown) within the side walls 22 in a well known manner.

The scaffold rack 10 is comprised basically of a plurality of upright members 24, each having an upper end portion 26 and a lower end portion 28, a pair of stud members 30 fixed by welding or the like to each upright member 24 adjacent the upper end portion 26 thereof, the stud members 30 being disposed at substantially right angles with respect to each other and with respect to their associated upright member (note particularly FIGURE 3), and a plurality of cross bars 32 and a plurality of side bars 34 each having end portions removably secured to the stud members 30 as will be explained in further detail hereinafter. Two cross bars 32, two side bars 34, and four upright members 24 cooperate to define a scaffold rack unit, three such units being shown at 10a, 10b, and 10c in FIGURE 1 as superimposed one upon the other.

Figure 3:
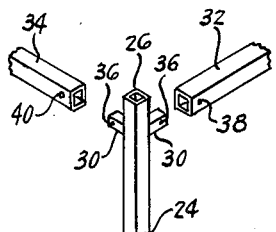
FIGURE 3 is an enlarged fragmentary perspective exploded view of the upright member and portions of the cross bar and side bars secured thereto for the lowermost scaffold rack unit.

As will be seen particularly in FIGURE 3, the end portions of the cross bars 32 and the side bars 34 are tubular and telescopingly receive the studs 30 therewithin, attaching means removably securing these elements to each other. The attaching means comprises basically portions of the stud members 30 defining transverse apertures 36, portions of the end portions of the cross bar 32 and the side 34 defining additional transverse apertures 38 and 40, respectively, and a pin member 42 received through the aligned apertures to hold the elements in related assembly. The pin member is shown in detail in FIGURE 4 and includes an enlarged headed portion 44 at one end and a bifurcated end 45 to which is pivotally secured intermediate its ends a locking element 46, the locking element 46 depending as shown in FIGURE 4 under the force of gravity and retaining the pin member 42 within the aligned apertures.

Figure 2:
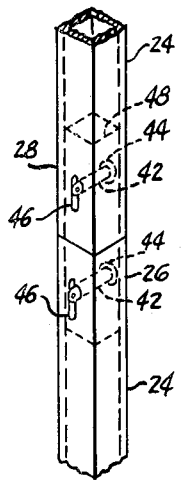
FIGURE 2 is an enlarged fragmentary perspective view of the means for securing the upright members of superimposed scaffold rack units to each other, certain portions being shown in dotted lines.

The scaffold rack units 10a, 10b, and 10c are secured in superimposed relationship by means of connecting members 48 shown in dotted lines in FIGURE 2. The upper and lower end portions 26, 28, respectively, of the upright members 24 are tubular, and a connecting member 48 is received within the tubular upper end portion 26 of an upright member 24 defining part of one of the scaffold rack units and within the lower end portion 28 of an upright member 24 defining part of the next higher scaffold rack unit. Transverse apertures are defined in the upper and lower end portions 26, 28, respectively of the upright members 24 and additional transverse apertures are defined through the connecting members 48, one of the apertures in the connecting member 48 being aligned with the apertures in the upper end portion 26 of the upright member 24 defining part of the lower scaffold rack unit and the other aperture in the connecting member 48 being aligned with the apertures in the lower end portion 28 of the upright member 24 defining part of the next higher scaffold rack unit, with pin members such as shown at 42 in FIGURE 4 being received through the aligned apertures to hold the elements in related assembly.

Figure 1:
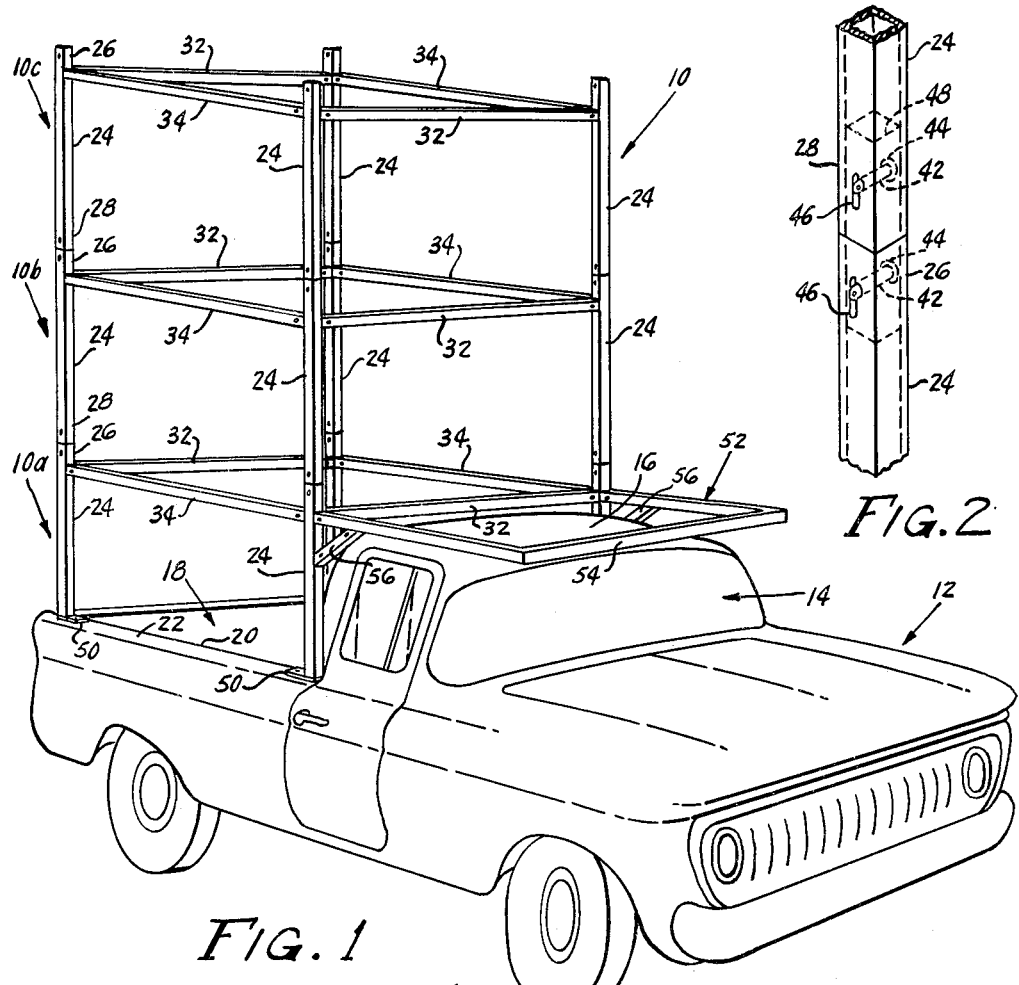
FIGURE 1 is a perspective view of a scaffold rack in accordance with the instant invention carried by a conventional pickup truck, with a plurality of scaffold rack units mounted thereon.

The upright members 24 of the lowermost scaffold rack unit as shown at 10a in FIGURE 1 includes foot members or plates 50 as will be seen enlarged in FIGURE 3 extending outwardly perpendicular to the length of the upright member 24 and spaced upwardly from the lower end portion 28 thereof. The foot members 50 rest on the sill portions 22 of the upstanding side walls 20 of the bed portion 18 of the pickup truck 12 when the lower end portions 28 of the upright members 24 are received in the aforementioned stake pockets (not shown). Thus, the body of the truck 12 actually bears the load carried by the scaffold rack 10 rather than the stake pockets themselves. This is necessary since many truck manufacturers are no longer furnishing bottoms in the stake pockets and other manufacturers are merely providing a light gauge stamped metal bottom that is only secured in place by the forming of the metal and which would only carry a light load. Certain stake pockets provided by the manufacturer have only three sides thereby precluding adequate support for a scaffold rack, such as shown in the drawing. The upright members 24 particularly of the lowermost scaffold rack unit 10a are sufficient in length to position the stud members 30 thereon above the top 16 of the cab portion 14 of the pickup truck 12 to insure that any elongated elements carried by this unit will clear the cab portion. A cab protector 52 comprising a substantially U-shaped frame 54 may be either fixedly or removably secured to the front two upright members 24 of the lowermost scaffold rack unit 10a with brace members 56 provided to support the same, the protector 52 extending from the lowermost scaffold rack unit 10a into overlying relationship with the top 16 of the cab portion 14 and being substantially aligned with the stud members 30 on the upright members 24 of the lowermost scaffold rack unit 10a to provide an elongated rack for carrying such articles as lumber, ladders, or the like.

While the aforementioned descriptive matter has been particularly directed to the utilization of the scaffold rack 10 of the instant invention in conjunction with a conventional pickup truck 12, it is to be understood that the scaffold rack may be rendered self supporting by addition of caster wheels such as shown in FIGURE 5 at 58 having upstanding lug portions shown in dotted lines at 60 with transverse apertures aligned with the transverse apertures in the lower end portion 28 of the upright members 24 of the lowermost scaffold rack unit 10a to receive attaching means such as the pin members 42 for securing these elements in related assembly.

The use and operation of the scaffold rack of the instant invention will now be apparent. Individual scaffold rack units may be readily assembled by telescopingly engaging the cross bars 32 and the side bars 34 with the stud members 30 on a plurality of upright members 24 and securing the pin members 42 through the aligned apertures therein. Additional scaffold rack units may be superimposed, one upon the other, by telescopingly engaging connecting members 48 in the upper end portions 26 of upright members 24 forming a lower scaffold rack unit and in the lower end portions 28 of upright members 24 forming the next higher scaffold rack unit and securing the elements in related assembly by pin members 42. The lowermost scaffold rack unit 10a may either be carried by the stake pockets in the pickup truck 12 with the foot members 50 resting on the sill portions 22 of the side walls 20 or caster wheels 58 may be secured in the lower end portions 28 of the upright members 24 of the same by pin members 42.

Disassembly of the scaffold rack unit may be readily accomplished by reversing the above procedure.

Each of the elements of the scaffold rack 10 of the instant invention may be formed of any desired material, preferably a heavy gauge steel, with the upright members 24, the cross bars 32, and the side bars 34 being tubular in form and with the connecting members 48 being of a slightly smaller cross section tubular material.

It will now be seen that there is herein provided an improved scaffold rack which allows the placement of one, two, or more units on top of each other without sacrificing strength. A contractor may readily build his pickup truck into a rolling scaffolding for work on high elements while still having free access to the materials within the pickup portion of his truck body. Quick and efficient disassembly is provided by the particular construction of the device and selected disassembly may be accomplished readily to allow relatively large articles to be placed on the pickup portion of the truck. In view of the substantially complete breakdown of the units, storage or transportation of the disassembled scaffold rack is facilitated. With the addition of a plurality of sections vertically superimposed, the scaffold rack can be utilized for carrying a number of large bulky items, such as boats or the like. Quick modification for self supporting operation is afforded by the use of removable caster members.

Thus, all of the objectives of the instant invention, and others, including many advantages of great practical utility and commercial importance are provided by the device of the instant invention.

Since many embodiments may be made of the instant inventive concept, and since many modifications may be made of the embodiments hereinbefore shown and described, it is to be understood that all matter herein is to be interpreted merely as illustrative, and not in a limiting sense.

I claim:

1. A scaffold rack adapted to be mounted on the body of a pickup truck comprising, in combination, a plurality of scaffold rack units, each comprising, a plurality of hollow upright members of rectangular cross section each having an upper end portion and a lower end portion, a pair of stud members of rectangular cross section fixed to each of said upright members adjacent said upper end portion of the same, said stud members on each upright member being disposed at substantially right angles with respect to each other and with respect to said upright member, a plurality of hollow cross bars and a plurality of hollow side bars each of rectangular cross section and having end portions fitted telescopically over said stud members, two of said cross bars and two of said side bars cooperating with four of said upright members to define one scaffold rack unit, a plurality of connecting members, each of said connecting members being of rectangular cross section and telescopingly received within the hollow upper end portion of an upright member defining part of one scaffold rack unit and the hollow lower end portions of an upright member defining part of a next higher scaffold rack unit, said hollow upper and lower end portions of each upright member having transverse apertures therethrough, portions of each connecting member having additional transverse apertures therethrough aligned with said apertures in said hollow upper end portion of the upright member defining part of said one scaffold rack unit and other portions of each connecting member having additional transverse apertures aligned with said apertures in said tubular lower end portion of the upright member defining part of said next higher scaffold rack unit, and pin members each including an enlarged headed portion at one end and a pivotally secured locking element at the opposite end received through said aligned apertures, comprising attaching means removably securing each of said connecting members to said hollow upper and lower end portions of its associated upright member.

2. The structure of claim 1 further including, in combination, a plurality of caster members, said lower end portions of the upright portions defining part of said one scaffold rack unit removably carrying said caster members.

3. The structure of claim 2 wherein said caster members include lug elements telescopingly received within the hollow lower end portions of the upright portions defining part of said one rack, and attaching means removably securing said lug elements to said lower end portions.

4. The structure of claim 3 wherein said last mentioned attaching means includes portions of said hollow lower end portions defining transverse apertures therethrough, portions of said lug elements defining additional transverse apertures therethrough aligned with said apertures in said hollow lower end portions, and pin members received through said aligned apertures.

5. The structure of claim 4 wherein each of said last mentioned pin members includes an enlarged headed portion at one end and a pivotally secured locking element at the opposite end.

References Cited by the Examiner
UNITED STATES PATENTS

| | | | |
|---|---|---|---|
| Re. 24,535 | 9/1958 | Franks. | |
| 1,051,893 | 2/1913 | Joseph | 24—212 |
| 1,194,902 | 8/1916 | Urban | 24—212 |
| 1,764,413 | 6/1930 | Nielsen | 108—111 |
| 1,854,777 | 4/1932 | Bales | 108—111 |
| 2,720,414 | 10/1955 | Hart | 211—182 |
| 2,947,566 | 8/1960 | Tower | 211—182 X |
| 2,997,317 | 8/1961 | Scott | 287—2 |
| 3,104,626 | 9/1963 | Brunette | 211—182 |

GERALD M. FORLENZA, *Primary Examiner.*

HUGO O. SCHULZ, *Examiner.*